(12) United States Patent
Higbee et al.

(10) Patent No.: US 9,356,948 B2
(45) Date of Patent: *May 31, 2016

(54) COLLABORATIVE PHISHING ATTACK DETECTION

(71) Applicant: PhishMe, Inc., Chantilly, VA (US)

(72) Inventors: Aaron Higbee, Leesburg, VA (US); Rohyt Belani, New York, NY (US); Scott Greaux, Glenmont, NY (US)

(73) Assignee: PhishMe, Inc., Chantilly, VA (US)

( * ) Notice: Subject to any disclaimer, the term of this patent is extended or adjusted under 35 U.S.C. 154(b) by 118 days.

This patent is subject to a terminal disclaimer.

(21) Appl. No.: 13/958,480

(22) Filed: Aug. 2, 2013

(65) Prior Publication Data

US 2014/0230061 A1   Aug. 14, 2014

Related U.S. Application Data

(63) Continuation-in-part of application No. 13/918,702, filed on Jun. 14, 2013, which is a continuation-in-part of application No. 13/785,252, filed on Mar. 5, 2013, now Pat. No. 8,719,940, which is a continuation of application No. 13/763,538, filed on Feb. 8, 2013, now Pat. No. 9,253,207.

(51) Int. Cl.
  *G06F 11/00* (2006.01)
  *H04L 29/06* (2006.01)

(52) U.S. Cl.
  CPC ........ *H04L 63/1433* (2013.01); *H04L 63/1416* (2013.01); *H04L 63/1466* (2013.01); *H04L 63/1483* (2013.01)

(58) Field of Classification Search
  CPC .............. H04L 63/145; H04L 63/1416; H04L 63/1408; H04L 63/1441; G06F 21/56; G06F 21/562; G06F 21/564

USPC ....................................... 726/22, 24; 713/188
See application file for complete search history.

(56) References Cited

U.S. PATENT DOCUMENTS 5,892,903 A   4/1999   Klaus
6,954,858 B1  10/2005  Welborn et al.

(Continued)

FOREIGN PATENT DOCUMENTS

JP   2006-285844 A   10/2006
JP   2007-323640 A   12/2007

(Continued)

OTHER PUBLICATIONS

Alberto Trevino, Spam Filtering Through Header Relay Detection, Mar. 2007.*

(Continued)

*Primary Examiner* — Ali Abyaneh
(74) *Attorney, Agent, or Firm* — CipherLaw

(57) ABSTRACT

Described herein are methods, network devices and machine-readable storage media for detecting whether a message is a phishing attack based on the collective responses from one or more individuals who have received that message. The individuals may flag the message as a possible phishing attack, and/or may provide a numerical ranking indicating the likelihood that the message is a possible phishing attack. As responses from different individuals may have a different degree of reliability, each response from an individual may be weighted with a corresponding trustworthiness level of that individual, in an overall determination as to whether a message is a phishing attack. A trustworthiness level of an individual may indicate a degree to which the response of that individual can be trusted and/or relied upon, and may be determined by how well that individual recognized simulated phishing attacks.

30 Claims, 5 Drawing Sheets

(56) References Cited

U.S. PATENT DOCUMENTS

| | | |
|---|---|---|
| 7,281,031 B1 | 10/2007 | Wang et al. |
| 7,325,252 B2 | 1/2008 | Bunker, V et al. |
| 7,373,385 B2 | 5/2008 | Prakash |
| 7,457,823 B2 | 11/2008 | Shraim et al. |
| 7,490,356 B2 | 2/2009 | Lieblich et al. |
| 7,509,675 B2 | 3/2009 | Aaron |
| 7,562,222 B2 | 7/2009 | Gasparini et al. |
| 7,603,709 B2 | 10/2009 | Lewis et al. |
| 7,617,532 B1 | 11/2009 | Alexander et al. |
| 7,634,810 B2 | 12/2009 | Goodman et al. |
| 7,668,921 B2 | 2/2010 | Proux et al. |
| 7,681,234 B2 | 3/2010 | Florencio et al. |
| 7,685,631 B1 | 3/2010 | Paya et al. |
| 7,788,723 B2 | 8/2010 | Huddleston |
| 7,802,298 B1 | 9/2010 | Hong et al. |
| 7,841,003 B1 | 11/2010 | Emdee |
| 7,854,007 B2 | 12/2010 | Sprosts et al. |
| 7,865,958 B2 | 1/2011 | Lieblich et al. |
| 7,904,518 B2 | 3/2011 | Marino et al. |
| 7,925,883 B2 * | 4/2011 | Florencio et al. ............ 713/178 |
| 7,958,555 B1 | 6/2011 | Chen et al. |
| 7,971,246 B1 | 6/2011 | Emigh et al. |
| 7,987,495 B2 | 7/2011 | Maler et al. |
| 8,103,627 B1 | 1/2012 | Qiu et al. |
| 8,132,011 B2 | 3/2012 | Gasparini et al. |
| 8,141,150 B1 * | 3/2012 | Krishnamurthy ............... 726/22 |
| 8,181,232 B2 | 5/2012 | Grandcolas et al. |
| 8,191,148 B2 | 5/2012 | Oliver et al. |
| 8,209,381 B2 | 6/2012 | Sinn et al. |
| 8,220,047 B1 | 7/2012 | Soghoian et al. |
| 8,271,007 B2 | 9/2012 | Cai et al. |
| 8,271,588 B1 * | 9/2012 | Bruno et al. .................. 709/206 |
| 8,286,249 B2 | 10/2012 | Adelstein et al. |
| 8,291,065 B2 | 10/2012 | Goodman et al. |
| 8,296,376 B2 | 10/2012 | Goldberg et al. |
| 8,321,934 B1 | 11/2012 | Cooley et al. |
| 8,327,421 B2 | 12/2012 | Ting |
| 8,332,918 B2 | 12/2012 | Vedula et al. |
| 8,365,246 B2 | 1/2013 | Readshaw |
| 8,381,293 B2 | 2/2013 | Emigh et al. |
| 8,407,798 B1 | 3/2013 | Lotem et al. |
| 8,423,483 B2 | 4/2013 | Sadeh-Koniecpol et al. |
| 8,438,642 B2 | 5/2013 | Feng et al. |
| 8,464,346 B2 | 6/2013 | Barai et al. |
| 8,464,352 B2 | 6/2013 | Toomey |
| 8,468,244 B2 | 6/2013 | Redlich et al. |
| 8,484,741 B1 | 7/2013 | Chapman |
| 8,484,744 B1 | 7/2013 | De et al. |
| 8,608,487 B2 | 12/2013 | Huie et al. |
| 8,615,807 B1 | 12/2013 | Higbee et al. |
| 8,635,666 B2 | 1/2014 | Curnyn |
| 8,635,703 B1 | 1/2014 | Belani et al. |
| 8,640,231 B2 | 1/2014 | Florencio et al. |
| 8,713,677 B2 | 4/2014 | Soghoian et al. |
| 8,719,940 B1 | 5/2014 | Higbee et al. |
| 8,776,196 B1 | 7/2014 | Oliver et al. |
| 8,793,799 B2 | 7/2014 | Fritzson et al. |
| 8,826,444 B1 * | 9/2014 | Kalle ............................ 726/26 |
| 8,910,287 B1 | 12/2014 | Belani et al. |
| 8,966,637 B2 | 2/2015 | Belani et al. |
| 9,015,472 B1 | 4/2015 | Chasin |
| 9,154,514 B1 | 10/2015 | Prakash |
| 9,160,766 B2 | 10/2015 | Kashyap et al. |
| 9,177,314 B2 | 11/2015 | Uzo |
| 9,224,117 B2 | 12/2015 | Chapman |
| 9,245,115 B1 | 1/2016 | Jakobsson |
| 9,270,696 B2 | 2/2016 | Fritzson et al. |
| 2002/0091940 A1 | 7/2002 | Welborn et al. |
| 2005/0132225 A1 | 6/2005 | Gearhart |
| 2005/0183143 A1 | 8/2005 | Anderholm et al. |
| 2005/0268100 A1 | 12/2005 | Gasparini et al. |
| 2006/0075504 A1 | 4/2006 | Liu |
| 2006/0080735 A1 | 4/2006 | Brinson et al. |
| 2006/0123464 A1 | 6/2006 | Goodman et al. |
| 2006/0123478 A1 | 6/2006 | Rehfuss et al. |
| 2006/0168066 A1 | 7/2006 | Helsper et al. |
| 2006/0174119 A1 | 8/2006 | Xu |
| 2006/0225136 A1 | 10/2006 | Rounthwaite et al. |
| 2006/0271631 A1 | 11/2006 | Qureshi et al. |
| 2007/0039038 A1 | 2/2007 | Goodman et al. |
| 2007/0107053 A1 | 5/2007 | Shraim et al. |
| 2007/0136806 A1 | 6/2007 | Berman |
| 2007/0192855 A1 | 8/2007 | Hulten et al. |
| 2007/0245422 A1 | 10/2007 | Hwang et al. |
| 2007/0250618 A1 | 10/2007 | Hammond |
| 2007/0294352 A1 | 12/2007 | Shraim et al. |
| 2008/0037583 A1 | 2/2008 | Dawes et al. |
| 2008/0037791 A1 | 2/2008 | Jakobsson |
| 2008/0040274 A1 | 2/2008 | Uzo |
| 2008/0046970 A1 | 2/2008 | Oliver et al. |
| 2008/0047017 A1 | 2/2008 | Renaud |
| 2008/0052359 A1 | 2/2008 | Golan et al. |
| 2008/0141342 A1 | 6/2008 | Curnyn |
| 2008/0172382 A1 | 7/2008 | Prettejohn |
| 2008/0184349 A1 | 7/2008 | Ting |
| 2008/0244715 A1 | 10/2008 | Pedone |
| 2008/0271124 A1 | 10/2008 | Nisbet et al. |
| 2008/0288303 A1 | 11/2008 | Gray et al. |
| 2008/0288330 A1 | 11/2008 | Hildebrand et al. |
| 2009/0013041 A1 | 1/2009 | Farmer et al. |
| 2009/0089859 A1 | 4/2009 | Cook et al. |
| 2009/0144308 A1 | 6/2009 | Huie et al. |
| 2009/0172772 A1 | 7/2009 | Souille |
| 2009/0240774 A1 | 9/2009 | Sachtjen |
| 2009/0241168 A1 * | 9/2009 | Readshaw ........................ 726/3 |
| 2009/0241173 A1 | 9/2009 | Troyansky |
| 2009/0259725 A1 | 10/2009 | Rabinovich |
| 2009/0265430 A1 | 10/2009 | Bechtel et al. |
| 2009/0282112 A1 | 11/2009 | Prakash |
| 2009/0292925 A1 | 11/2009 | Meisel |
| 2009/0300768 A1 | 12/2009 | Krishnamurthy et al. |
| 2009/0318130 A1 | 12/2009 | Naylor et al. |
| 2009/0319647 A1 | 12/2009 | White et al. |
| 2009/0320137 A1 | 12/2009 | White et al. |
| 2009/0328208 A1 | 12/2009 | Peters |
| 2010/0017616 A1 | 1/2010 | Nichols et al. |
| 2010/0031041 A1 | 2/2010 | Cohen |
| 2010/0043071 A1 | 2/2010 | Wang |
| 2010/0083383 A1 | 4/2010 | Adler et al. |
| 2010/0125911 A1 | 5/2010 | Bhaskaran |
| 2010/0138925 A1 | 6/2010 | Barai et al. |
| 2010/0154055 A1 | 6/2010 | Hansen |
| 2010/0205014 A1 | 8/2010 | Sholer et al. |
| 2010/0211641 A1 | 8/2010 | Yih et al. |
| 2010/0235918 A1 | 9/2010 | Mizrahi et al. |
| 2010/0281536 A1 | 11/2010 | Richards et al. |
| 2010/0299292 A1 | 11/2010 | Collazo |
| 2010/0306845 A1 | 12/2010 | Vaithilingam et al. |
| 2010/0313266 A1 | 12/2010 | Feng et al. |
| 2011/0030059 A1 | 2/2011 | Greenwald |
| 2011/0055922 A1 | 3/2011 | Cohen et al. |
| 2011/0061089 A1 | 3/2011 | O'Sullivan et al. |
| 2011/0072262 A1 | 3/2011 | Amir et al. |
| 2011/0078795 A1 | 3/2011 | Liu |
| 2011/0083182 A1 | 4/2011 | Emdee |
| 2011/0093546 A1 | 4/2011 | Rubingh |
| 2011/0184877 A1 | 7/2011 | McHugh et al. |
| 2011/0225652 A1 | 9/2011 | Emigh et al. |
| 2011/0238855 A1 | 9/2011 | Korsunsky et al. |
| 2011/0246634 A1 | 10/2011 | Liu et al. |
| 2012/0023566 A1 | 1/2012 | Waterson et al. |
| 2012/0096553 A1 | 4/2012 | Srivastava et al. |
| 2012/0124671 A1 * | 5/2012 | Fritzson et al. ............... 726/26 |
| 2012/0174235 A1 | 7/2012 | Hamilton, II et al. |
| 2012/0258437 A1 | 10/2012 | Sadeh-Koniecpol et al. |
| 2012/0311669 A1 | 12/2012 | Akase |
| 2012/0311703 A1 | 12/2012 | Yanovsky et al. |
| 2012/0324568 A1 | 12/2012 | Wyatt et al. |
| 2012/0324576 A1 | 12/2012 | Clark et al. |
| 2013/0018972 A1 | 1/2013 | Sargent et al. |
| 2013/0031627 A1 | 1/2013 | Wang et al. |
| 2013/0086677 A1 | 4/2013 | Ma et al. |
| 2013/0110614 A1 | 5/2013 | Wagner et al. |
| 2013/0132857 A1 | 5/2013 | Shapiro |

(56) References Cited

U.S. PATENT DOCUMENTS

| | | |
|---|---|---|
| 2013/0145462 A1 | 6/2013 | Hsu et al. |
| 2013/0145465 A1 | 6/2013 | Wang et al. |
| 2013/0198846 A1 | 8/2013 | Chapman |
| 2013/0203023 A1 | 8/2013 | Sadeh-Koniecpol et al. |
| 2013/0268470 A1 | 10/2013 | Yablokov et al. |
| 2014/0082726 A1 | 3/2014 | Dreller et al. |
| 2014/0101236 A1 | 4/2014 | Dietrich et al. |
| 2014/0199663 A1 | 7/2014 | Sadeh-Koniecpol et al. |
| 2014/0199664 A1 | 7/2014 | Sadeh-Koniecpol |
| 2014/0280624 A1 | 9/2014 | Dillingham et al. |
| 2014/0337995 A1 | 11/2014 | Fritzson et al. |
| 2015/0229664 A1 | 8/2015 | Hawthorn |
| 2015/0287336 A1 | 10/2015 | Scheeres |
| 2016/0036829 A1 | 2/2016 | Sadeh-Koniecpol |

FOREIGN PATENT DOCUMENTS

| | | |
|---|---|---|
| WO | 2011/017196 A2 | 2/2011 |
| WO | 2012/068255 A2 | 5/2012 |

OTHER PUBLICATIONS

Markus Jakobsson et al., "Designing Ethical Phishing Experiments: A study of (ROT13) rOnl query features", Indiana University, Bloomington, IN 47406, USA, WWW 2006, May 23-26, 2006, Edinburgh, Scotland, ACM 1595933239/06/0005., 10 pages.

"To defeat phishing, Energy learns to phish", gcn.com/Articles/2011/06/13/DOE-Phishing-Test.aspx?p=1, accessed Sep. 9, 2013, 3 pages.

"Humans are the Front Line' against Phishing for Intrepidus Group", blog.executivebiz.com/2010/03/humans-are-the-front-line-against-phishing-for-intrepidus-group/, accessed Sep. 9, 2013; 3 pages.

"InfoSec: 23 percent of users fall for spear phishing", www.scmagazine.com/infosec-23-percent-of-users-fall-for-spear-phishing/article/128480/#, accessed Sep. 9, 2013, 3 pages.

"Intrepidus Group and BrandProtect Partner to Offer Holistic Anti-Phishing Solution", www.redorbit.com/news/technology/1670312/intrepidus_group_and_brandprotect_partner_to_offer_holistic_antiphishing_solution/, accessed Sep. 9, 2013; 3 pages.

Ponnurangam Kumaraguru, "PhishGuru: A System for Educating Users about Semantic Attacks", 2009 dissertation, School of Computer Science, Institute for Software Research, Carnegie Mellon University, Pittsburgh, PA 15213, 198 pages.

Ponnurangam Kumaraguru et al, "Lessons From a Real World Evaluation of Anti-Phishing Training", Carnegie Mellon University, 14 pages.

"One-Quarter of Worldwide Population at Risk of Spear Phishing Attacks", www.certmag.com/read.php?in=5245, accessed Sep. 9, 2013, 2 pages.

Thomas Claburn, "Phish Your Colleagues With PhishMe", www.informationweek.com/security/client/phish-your-colleagues-with-phishme/209400255, accessed Sep. 9, 2013, 2 pages.

Jim Hansen, "Phishing for phishing awareness", 2011-2013, 18 pages.

16. "PhishMe.com Overview" (2010) (Filename: "PhishMe Information for DHS.pdf").

"Phishme.com Internal Communication" , ha.ckers.org/blog/20080306/phishmecom-internal-communication/, accessed Sep. 9, 2013, 5 pages.

Phishme,com, "Introduction to PhishMe.com", Nov. 2010, 15 pages.

Tom Olzak, "Phishme: The Easy Way to Enhance Employee Phishing Awareness", CISSP, updated: Jul. 4, 2011, www.brighthub.com/computing/enterprise-security/reviews/5298.aspx, accessed Sep. 9, 2013, 3 pages.

Lori Faith Cranor, "Can Phishing be Foiled?", Scientific American, Dec. 2008, 7 pages.

"Social Phishing" Tom N. Jagatic, Nathaniel A. Johnson, Markus Jakobsson, Filippo Menczer Communications of the ACM, vol. 50 No. 10, pp. 94-100.

"Reduce the risk from targeted phishing and malware attacks. On demand.", Stratum Security, Jun. 2011, 2 pages.

"ThreatSim: Executive Summary", Stratum Security, 2011, 6 pages.

Steve Sheng et al., "Who Falls for Phish? A Demographic Analysis of Phishing Susceptibility and Effectiveness of Interventions", Carnegie Mellon University, Indraprastha Institute of Information Technology, ACM, Apr. 10-15, 2010, Atlanta, Georgia, USA,10 pages.

"An Empirical Evaluation of PhishGuruTM Embedded Training" Wombat Security Technologies, Apr. 2009, 12 pages.

"What is PhishMe?", Interpidus Group, 2009, 1 page.

Rohyt Belani, "Spear Phishing Train Your Workforce to Dodge the Hook" 2009, 26 pages.

"Phishing for user security awareness" Dodge, Ronald C.; Carver, Curtis; Ferguson, Aaron J. Computers & Security , vol. 26 (1), Elsevier, Feb. 1, 2007, 8 pages.

Alnajim, Abdullah, et al., "An Anti-Phishing Approach that Uses Training Intervention for Phishing Websites Detection," 2009 Sixth International Conference on Information Technology: New Generations, 2009, DD. 405-410, IEEE, USA.

Toolan, Fergus, et al., "Feature Selection for Spam and Phishing Detection," 2010 eCrime Researchers Summit, 2010, pp. 1-12, IEEE, USA.

Fette, Ian, et al., "Learning to Detect Phishing Emails," Carnegie Mellon Cyber Laboratory Technical Report CMU-CYLAB-06-012, Jun. 2006, pp. 1-12, Carnegie Mellon University, PA, USA.

Soni, Pravin, et al., "A Phishing Analysis of Web Based Systems," /CCCS'11Feb. 12-14, 2011, Rourke/a, Odisha, India, 2011, pp. 527-530, ACM, USA.

Alnajim, A., et al., "An Approach to the Implementation of the Anti-Phishing Tool for Phishing Websites Detection," International Conference on Intelligent Networking and Collaborative Systems, 2009, p. 105-112, IEEE, USA.

He, Mingxing, et al., "An efficient phishing webpage detector," Expert Systems with Applications, 2011, pp. 12018-12027, vol. 38, Elsevier Ltd., UK.

Zhang, Yue, et al., "CANTINA: A Content-Based Approach to Detecting Phishing Web Sites," Proceedings of the 16th International Conference on World Wide Web, May 8-12, 2007, Banff, Alberta, Canada, May 2007, pp. 639-648, ACM, USA.

Wenyin, Liu, et al., "Detection of Phishing Webpages based on Visual Similarity," 14th International Conference on World Wide Web, May 10-14, 2005, Chiba, Japan, DD. 1060-1061, ACM, USA.

Parno, Bryan, et al., "Phoolproof Phishing Prevention," CyLab Carnegie Mellon University, Dec. 3, 2005, 16 pages, Carnegie Mellon University, PA, USA.

Dhamija, Rachna, et al., "The Battle Against Phishing: Dynamic Security Skins," Symposium on Usable Privacy and Security (SOUPS) 2005, Jul. 6-8, 2005, Pittsburgh, PA, USA, 12 pages.

Huang, Chun-Ying, et al., "Using one-time passwords to prevent password phishing attacks," Journal of Network and Computer Applications, 2011, DD. 1-10, Elsevier B.V., NL.

Jackson, Collin, et al., "An Evaluation of Extended Validation and Picture-in-Picture Phishing Attacks," Financial Cryptography and Data Security, 2007, 13 pages, Springer-Verlag, DE.

Kang, Le, et al., "CAPTCHA Phishing: A Practical Attack on Human Interaction Proofing," Inscrypt 2009, LNCS 6151, 2010, pp. 411-425, Springer-Verlag, DE.

Dazeley, Richard, et al, "Consensus Clustering and Supervised Classification for Profiling Phishing Emails in Internet Commerce Security," PKAW 2010, LNAI 6232, 2010, pp. 235-246, Springer-Verlag, DE.

Jakobsson, Markus, "Modeling and Preventing Phishing Attacks," Lecture Notes in Computer Science, Indiana University at Bloomington, 2005, pp. 1-19, Bloomington, IN.

Dhamija, Rachna, et al., "Why Phishing Works," Proceeding ofCHI-2006: Conference on Human Factors in Computing Systems, Apr. 2006, 10 pages.

Wu, Min, et al., "Do Security Toolbars Actually Prevent Phishing Attacks?," CHI 2006, Apr. 22-27, 2006, Montreal, Quebec, Canada, 2006, 10 pages, ACM, USA.

(56) References Cited

OTHER PUBLICATIONS

Zhang, Yue, et al., "Phinding Phish: Evaluating Anti-Phishing Tools," Proceedings of the 14th Annual Network and Distributed System Security Symposium (NOSS 2007), 2007, 16 pages.
Egelman, Serge, et al., "You've Been Warned: An Empirical Study of the Effectiveness of Web Browser Phishing Warnings," CHI 2008, Apr. 5-10, 2008, Florence, Italy, 2008, 10 pages, ACM, USA.
Downs, Julie, et al., "Decision Strategies and Susceptibility to Phishing," Symposium on Usable Privacy and Security (SOUPS), Jul. 12-14, 2006, Pittsburgh, PA, USA, 2006, 12 pages.
Wright, Ryan, et al., "The Influence of Experiential and Dispositional Factors in Phishing: An Empirical Investigation of the Deceived," Journal of Management Information Systems, Summer 2010, IPP. 273-303, vol. 27, No. 1, M.E. Sharpe, Inc., USA.
Sheng, Steve, et al., "Who Falls for Phish? A Demographic Analysis of Phishing Susceptibility and Effectiveness of Interventions," CHI 2010, Apr. 10-15, 2010, Atlanta, Georgia, USA, 2010, 10 pages, ACM, USA.
Vishwanath, Arun, et al., "Why do people get phished? Testing individual difference in phishing vulnerability within an integrated, information processing model," Decision Support Systems, 2011, IDD. 576-586, vol. 51, Elsevier B.V., NL.
Alnajim, Abdullah, et al., "An Evaluation of Users' Anti-Phishing Knowledge Retention," 2009 International Conference on Information Management and Engineering, 2009, pp. 210-214, IEEE, USA.
Sheng, Steve, et al., "Anti-Phishing Phil: The Design and Evaluation of a Game That Teaches People Not to Fall for Phish," Symposium on Usable Privacy and Security (SOUPS) 2007, Jul. 18-20, 2007, Pittsburgh, PA, USA, 2007, 12 pages.
Kumaraguru, Ponnurangam, et al., "Protecting People from Phishing: The Design and Evaluation of an Embedded Training Email System," Proceeding of the SIGCHI Conference on Human Factors in Computing Systems, Apr. 2007, pp. 1-10, ACM, USA.
Blom, Elma, et al., "Dummy auxiliaries in child and adult second language acquisition of Dutch," Lingua, 2011, pp. 906-919, vol. 121, Elsevier B.V., NL.
Radford, Andrew, et al., "On the Acquisition of Universal and Parameterised Goal Accessibility Constraints by Japanese Learners of English," Essex Research Reports in Linguistics, Mar. 2011, 46 pages (cover and second page, and DD. 1-44), vol. 60, No. 5, University of Essex, UK.
Dominiguez, Laura, et al., "Testing the Predictions of the Feature Assembly Hypothesis Evidence from the L2 Acquisition of Spanish Aspect Morphology," Proceedings of the Boston University Conference on Language Development, 2011, 14 pages, vol. 35, Cascadilla Press, MA, USA.
Bliton, Daniel, et al., "Unannounced Phishing Exercises and Targeted Training: Results and Lessons Learned," Interservice/Industry Training, Simulation, and Education Conference (11/TSEC), 2011, pp. 1-11, Paper No. 11342, I/ITSEC, USA.
Adams, Elizabeth, et al., "Brief Overview: Mandatory Training—A Systematic Review of Research NPL and Trends in Learning Organizations," Veterans Health Administration Office of Patient Care Services Technology Assessment Program, TAP Brief Overview, Mar. 2010, 23 pages (cover page, pp. i-iii, and pp. 1-19), VA Technology Assessment Program, Boston, MA, USA.
Ferguson, Aaron J., "Fostering E-Mail Security Awareness: The West Point Carronade," Educause Quarterly, 2005, pp. 54-57, vol. 28, No. 1, Educause Online Publication, http://www.educause.edu/eq.
Hidi, Suzanne, et al., "Strategies for increasing text-based interest and students' recall of expository texts," Reading Research Quarterly, Fall 1988, pp. 465-483, XX.111/4, International Reading Association, Delaware, USA.
Klevinsky, T. J., et al., Chapter 3—Penetration for Hire, HACK I.T.—Security Through Penetration Testing, 2002, DD. 25-27, Addison-Wesley Professional, Pearson Education Ltd, USA.
Sadoski, Mark, "Resolving the Effects of Concreteness on Interest, Comprehension, and Learning Important Ideas From Text," Educational Psychology Review, 2001, pp. 263-281, vol. 13, No. 3, Plenum Publishing Corporation, NY, USA.
Simulating malicious emails to educate end users on-demand, Jansson, Kenny; Von Solms, Rossouw, IEEE Symposium on Web Society, p. 74-80, 2011, ISSN: 21586985, E-ISSN: 21586993; ISBN-13: 9781457702112; 2011 3rd Symposium on Web Society, SWS2011, Oct. 26, 2011-Oct. 28, 2011, Institute for ICT Advancement, Nelson Mandela Metropolitan University, Port Elizabeth, South Africa.
School of phish: a real-world evaluation of anti-phishing training, Ponnurangam Kumaraguru; Justin Cranshaw; Alessandro Acquisti; Lorrie Cranor; Jason Hong; Mary Ann Blair; Theodore Pham, Carnegie Mellon University, SOUPS '09 Proceedings of the 5th Symposium on Usable Privacy and Security, Article No. 3, ISBN: 978-1-60558-736-3; doi:10.1145/1572532.1572536, 12 pages.
Design a mobile game for home computer users to prevent from "phishing attacks", Arachchilage, Nalin Asanka Garnagedara; Cole, Melissa, International Conference on Information Society, i-Society 2011, p. 485-489, 2011, ISBN-13: 9780956426383; Article No. 5978543, International Conference on Information Society, i-Society 2011, Jun. 27, 2011-Jun. 29, 2011, School of Information Systems, Computing and Mathematics, Brunel University, Uxbridge, Middlesex, United Kingdom.
Kumaraguru et al., "Lessons From a Real World Evaluation of Anti-Phishing Training", 14 pages.
Robertson, "Amid the VIPERS Establishing Malware's Position Within the Information Ecosystem", 54 pages.
Sheng et al., "Anti-Phishing Phil: The Design and Evaluation of a Game That Teaches People Not to Fall for Phish", 14 pages.
Spinapolice, "Mitigating the Risk of Social Engineering Attacks", 67 pages.
stratumsecurity.com, "Announcing ThreatSim—Stratum's Spear Phishing and Data Exfiltration SaaS Offering", 1 pg.
Tsow et al., "Deceit and Deception: A Large User Study of Phishing", 46 pages.
Wombat Security Technologies, "Wombat Security Technologies Offers Tips, Training, and Free Simulated Phishing Attacks to Help Companies and their Employees Avoid Holiday Phishing Scams", 3 pages.
Steve Sheng, Mandy Holbrook, Ponnurangam Kumaraguru, Lorrie Cranor, Julie Downs, "Who Falls for Phish? A Demographic Analysis of Phishing Susceptibility and Effectiveness of Interventions" CHI 2010, Apr. 10-15, 2010, Atlanta, GA, USA, 10 pages.
"Phishme: The Easy Way to Enhance Employee Phishing Awareness", http://www.brighthub.com/computing/enterprise-security/reviews/5298.aspx; accessed Jul. 23, 2013; 5 pages.
"What is PhishMe?", http://phishme.com/whatisphishme.html; accessed Jul. 23, 2013; 2 pages.
Aaron Higbee, "Phishme.com—Techincal Paper", 2009, 10 pages.
Art Fritzson et al, U.S. Appl. No. 61/414,142, filed Nov. 16, 2010, "Phishing Awareness Training (PAT) Distinction Components" 39 pages.
Zhang et al., CANTINA: A Content-Based Approach to Detecting Phishing Web Sites, May 2007, The International World Wide Wed Conference Committee (IW3C2), pp. 639-648.
Alnajim et al., "An Evaluation of User's Anti-Phishing Knowledge Retention", 2009, International Conference on Information Management and Engineering, pp. 210-214.
Alnajim et al., "An Approach to the Implementation of the Anti-Phishing Tool for Phishing Websites Detection", 2009, International Conference on Intelligent Networking and Collaborative Systems, p. 105-112.
http://www.Phishme.com/how_phishme_works.php, Dec. 4, 2011, pp. 1-2.
http://www.phishme.com/what_is_phishme.php, Nov. 4, 2011, pp. 1-2.
Phishme.com Internal Communication ha.ckers.org web application security lab, Mar. 6, 2008, pp. 1-3.
K. Jansson and R. von Solms, "Social Engineering: Towards a Holistic Solution," presented at the South African Information Security Multi-Conference, Port Elizabeth, South Africa, 2010.
"What is PhishMe?"; Nov. 4, 2011; accessed at http://web.archive.org/web/20111104184530/http://www.phishme.com/what_is_phishme.php on May 9, 2015, 2 pgs.

(56) References Cited

OTHER PUBLICATIONS

K. Jansson and R. von Solms, "Phishing for phishing awareness", accepted author version posted online: Oct. 19, 2011; published online: Nov. 9, 2011, 18 pages.

K. Jansson and R. von Solms, "Towards a Social Engineering Resistant User Model," presented at 13th Annual conference on WWW Applications, Johannesburg, South Africa (2011).

"Phishme.com Internal Communication", ha.ckers.org web application security lab, Mar. 6, 2008, 5 pgs.

"How PhishMe Works", Dec. 4, 2011, accessed at http://web.archive.org/web/20111204012721/http://phishme.com/how_phishme_works.php on May 9, 2015, 2 pgs.

How to Create a Self-Signed Digital Certificate in Microsoft Office 2010, Nov. 20, 2010.

Building an encrypted and searchable audit log, 11th Annual Network and Distributed Security Symposium (NDSS 04), Feb. 5-6, 2004.

Automatically Encrypting all Incoming Email; Jan. 13, 2011.

"Establishing the Human Firewall: Reducing an Individual's Vulnerabiliity to Social Engineering Attacks", Scheeres, Jamison W., Air Force Institute of Technology, Mar. 2008.

Handl, Bc Marek. "Spam identification independent of email body contents." Diss. Master's thesis, Czech Technical University in Prague, Faculty of Electrical Engineering, Department of Computer Science and Engineering, 2010.

"Phishing Defenses for Webmail Providers", Rich Graves, Jun. 2012, accepted Jan. 20, 2013.

"Woops! Army's attempt at a phishing simulation bombs", Mar. 14, 2014, Aaron Higbee; accessed at http://phishme.com/woopsarmysattemptphishingsimulationbombs/ on Feb. 8, 2016.

"Phishing Detection Plug-In Toolbar Using Intelligent Fuzzy-Classification Mining Techniques"; Aburrous, M.; Khelifi, A.; International Journal of Soft Computing and Software Engineering, v 3, n 3; Mar. 2013.

"PhiGARo: Automatic Phishing Detection and Incident Response Framework"; Availability, Reliability and Security (ARES), 2014 Ninth International Conference, Sep. 8-12, 2014.

"Client-Side Defense Against Web-Based Identity Theft"; Neil Chou, Robert Ledesma, Yuka Teraguchi, John C. Mitchell; 2004.

"PhishCatch—A phishing detection tool"; Yu, W.D.; Nargundkar, S.; Tiruthani, N.; Proceedings 2009 33rd Annual IEEE International Computer Software and Applications Conference.

Art Fritzson et al, U.S. Appl. No. 61/502,678, filed Jun. 29, 2011, 62 pgs. (including "Phishing Awareness Training" (2010), "Unannounced Phishing Exercises and Targeted Training" (2011), "Automated Test Case Generator for Phishing Prevention" (2011)).

Non-Final Rejection of Feb. 25, 2015 in U.S. Appl. No. 13/763,538.
Non-Final Rejection of Mar. 26, 2014 in U.S. Appl. No. 13/763,538.
Final Rejection of Sep. 23, 2014 in U.S. Appl. No. 13/763,538.
Non-Final Rejection of Jul. 1, 2013 in U.S. Appl. No. 13/785,252.
Final Rejection of Oct. 29, 2015 in U.S. Appl. No. 13/918,702.
Non-Final Rejection of Feb. 11, 2015 in U.S. Appl. No. 13/918,702.
Non-Final Rejection of Jul. 16, 2015 in U.S. Appl. No. 13/958,480.
Non-Final Rejection of Apr. 24, 2015 in U.S. Appl. No. 14/620,245.
Final Rejection of Oct. 20, 2015 in U.S. Appl. No. 14/620,245.
Advisory Action of Nov. 14, 2014 in U.S. Appl. No. 13/763,538.

U.S. Appl. No. 61/729,991, "Determining Risk Exposure and Avoiding Fraud", by Bjorn Markus Jakobsson, filed Nov. 26, 2012.

U.S. Appl. No. 61/597,972, "Protecting Computer and Other Device Users", by Bjorn Markus Jakobsson and Karl Hampus Jakobsson, filed Feb. 13, 2012.

"How it Works | ThreatSim", available Jan. 15, 2012; accessed via archive.org at https://web.archive.org/web/20120115014307/http://threatsim.com/how-it-works on Feb. 26, 2016.

"Features | ThreatSim", available Jan. 15, 2012; accessed via archive.org at https://web.archive.org/web/20120115181806/http://www.threatsim.com/features on Feb. 26, 2016.

"Home | ThreatSim", available Jan. 14, 2012; accessed via archive.org at https://web.archive.org/web/20120114191637/http://www.threatsim.com/ on Feb. 26, 2016.

ThreatSim Product Overview, stratum//security, 2011.

ThreatSim Data Sheet, stratum//security, 2011.

Ponnurangam Kumaraguru, et al., "Protecting People from Phishing: The Design and Evaluation of an Embedded Training Email System", Institute for Software Research, Human Computer Interaction Institute, Heinz School of Public Policy, Engineering and Public Policy, Carnegie Mellon University, 2007, 10 pages.

"WhiteGold goes fishing for phishing", www.arnnet.com.au/article/299134/whitegold_goes_fishing_phishing/, accessed Jul. 23, 2013, 3 pages.

"United States Military Academies to Use PhishMe to Combat Spear Phishing", msmvps.com/blogs/donna/archive/2009/07/24/united-states-military-academies-to-use-phishme-to-combat-spear-phishing.aspx, accessed Jul. 24, 2013, 1 pg.

Brian M. Bowen et al., "Measuring the Human Factor of Cyber Security", Department of Computer Science Columbia University, 2011, 6 pages.

Aaron J. Ferguson, "Fostering E-Mail Security Awareness: The West Point Carronade", Educause Quarterly, No. 1, 2005, 4 pages.

Images from PhishMe Shockwave Animation (2008), 4 pages.

Jansson, Kenny, "A Model for Cultivating Resistance to Social Engineering Attacks", Dissertation, Sep. 2011, with attachments: a. Jansson, K., & von Solms, R., "Social Engineering: Towards a Holistic Solution," presented at the South African Information Security Multi-Conference, Port Elizabeth, South Africa (2010), b. Jansson, K., & von Solms, R., "Towards a Social Engineering Resistant User Model," presented at 13th Annual Conference on WWW Applications, Johannesburg, South Africa (2011), c. Jansson, K., & von Solms, R., Simulating Malicious Emails to Educate End Users on-Demand.

"Anti-phishing training adds attachments to mix", www.networkworld.com/news/2009/090209-anti-phishing-training-adds-attachments-to.html, accessed Sep. 9, 2013, 3 pages.

"Core Impact penetration tester goes phishing", InfoWorld, Jan. 7, 2008, 2 pages.

"Core Impact 7.5", www.infoworld.com/print/31390, SC Magazine, Aug. 2008, 1 page.

Victor Garza, "Product review: Core Impact penetration tester goes phishing", www.infoworld.com/print/31390, accessed Sep. 9, 2013, 3 pages.

\* cited by examiner

| Simulated Phishing Attack ID | Time | Sender | Recipient | Subject |
|---|---|---|---|---|
| 1 | 10:10 AM | Jane | Ann | Review Account Activity |
| 1 | 10:10 AM | Jane | Bob | Review Account Activity |
| 1 | 10:10 AM | Jane | Chip | Review Account Activity |
| 2 | 11:57 AM | Tom | Ann | Presentation Slides |
| 2 | 10:58 AM | Tom | Bob | Presentation Slides |
| 2 | 10:59 AM | Tom | Chip | Presentation Slides |
| ... | ... | ... | ... | ... |

Fig. 2

| Simulated Phishing Attack ID | Ann | Bob | Chip |
|---|---|---|---|
| 1 | Reported Attack | Reported Attack | Fell Victim |
| 2 | Fell Victim | Reported Attack | Fell Victim |
| 3 | Ignored Attack | Reported Attack | Reported Attack |
| 4 | Reported Attack | Reported Attack | Fell Victim |

Fig. 3

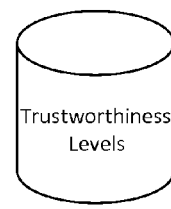

|  | Ann | Bob | Chip |
|---|---|---|---|
| Trustworthiness Levels | 1 | 4 | -2 |

Fig. 4

| Message | Ann | Bob | Chip | Score | Classify as Phishing Attack |
|---|---|---|---|---|---|
| 1 | | Reported Attack | Reported Attack | 2 | No |
| 2 | Reported Attack | Reported Attack | | 5 | Yes |
| 3 | | | Reported Attack | -2 | No |
| ... | ... | ... | ... | ... | ... |

Fig. 5

COLLABORATIVE PHISHING ATTACK DETECTION

RELATED APPLICATIONS

This application is a CONTINUATION-IN-PART of U.S. patent application Ser. No. 13/918,702, filed Jun. 14, 2013, which is a CONTINUATION-IN-PART of U.S. patent application Ser. No. 13/785,252, filed Mar. 5, 2013, which is a CONTINUATION of U.S. patent application Ser. No. 13/763,538, filed Feb. 8, 2013, and is also related to U.S. patent application Ser. No. 13/763,486, filed Feb. 8, 2013, and U.S. patent application Ser. No. 13/763,515, filed Feb. 8, 2013, the entire contents of each of which are incorporated herein by reference.

FIELD OF THE INVENTION

The present invention relates to methods, network devices and machine-readable media for detecting phishing attacks, and more specifically in one embodiment, relies upon the responses of individuals, weighted by their associated trustworthiness levels, to classify or not classify a message as a phishing attack.

BACKGROUND

In a phishing attack, an individual (e.g., a person, an employee of a company, an individual of a computing device) receives a message, commonly in the form of an e-mail, directing the individual to perform an action, such as opening an e-mail attachment or following (e.g., using a cursor controlled device or touch screen) an embedded link. If such message were from a trusted source (e.g., co-worker, bank, utility company), such action might carry little risk. Nevertheless, in a phishing attack, such message is from an attacker (e.g., an individual using a computing device to perform an malicious act on another computer device user) disguised as a trusted source, and an unsuspecting individual, for example, opening an attachment to view a "friend's photograph" might in fact install malicious computer software (i.e., spyware, a virus, and/or other malware) on his/her computer. Similarly, an unsuspecting individual directed (e.g., directed via an embedded link in an e-mail) to a webpage made to look like an authentic login or authentication webpage might be deceived into submitting (e.g., via a web form) his/her username, password or other sensitive information to an attacker.

While there are computer programs designed to detect and block phishing emails, phishing attacks methods are constantly being modified by attackers to evade such forms of detection. The present invention addresses some shortcoming of previous attempts to counter phishing attacks.

SUMMARY OF THE INVENTION

The inventors have observed that one effective means to counter phishing attacks is to make individuals more knowledgeable about phishing attacks. In an education process, individuals are subjected to simulated phishing attacks, which are designed to resemble actual phishing attacks. In response to a simulated attack, an individual typically either falls victim to it, ignores the attack, consciously chooses to not react or additionally reports the attack too (e.g., reports the attack to the information technology (IT) department, law enforcement, etc.). For those that fall victim to an attack, training is provided to decrease the likelihood that they will be deceived by a future simulated and/or real phishing attack. For those that identify the message as a possible phishing attack, if the message is determined to be a simulated phishing attack or, eventually, is determined to be a real phishing attack, feedback may be provided confirming that the message was a simulated phishing attack or real phishing attack, as appropriate. The respective responses of individuals is recorded (e.g., whether he/she fell victim to the attack, ignored the attack or reported the attack).

In the monitoring of individuals' responses, occasionally a message that is not a simulated phishing attack will be flagged (or otherwise identified) by one or more individuals as being a possible phishing attack. Such message could be an ordinary (i.e., not malicious) message that has been incorrectly identified by one or more individuals as a possible phishing attack (i.e., a false alarm), or could be a real phishing attack that has been correctly identified by one or more individuals (i.e., an accurate detection). One way to distinguish between these two possibilities is to perform an "independent" analysis of the flagged message (i.e., analysis not biased on the fact that a message has been flagged). In other words, the flagged message could be forwarded to a computer security expert who could provide an "official" determination as to the nature of the flagged message (e.g., whether it is a real phishing attack or not). Alternatively, the flagged message could be processed by computer software configured to detect phishing attacks. Such approaches which identify a phishing attack by recognizing characteristics indicative of a phishing attack (e.g., spoofed sender identifier, attachment with executable file type, etc.), however, are not the focus of the present application. Instead, the focus of the present application is to resolve the uncertainty of whether a message has been appropriately flagged by analyzing the reputation of the one or more individuals who have flagged the message. Stated differently, the key is to identify those individuals whose responses are likely to be accurate (i.e., trustworthy individuals) from others whose responses are less likely to identify the phishing attacks accurately (i.e., untrustworthy individuals). If such determination can be made, the responses of trustworthy individuals can be weighted more heavily as compared to the responses of untrustworthy individuals, or the responses of untrustworthy individuals can be ignored.

Conveniently, by conducting simulated phishing attacks on individuals and monitoring their performance, it is indeed possible to identify trustworthy individuals from untrustworthy individuals. Therefore, upon a message being identified by one or more individuals as being a possible phishing attack and such message further determined not to be a simulated phishing attack, the responses of each individual can be weighted by a trustworthiness level (e.g., based on how well he/she identified simulated phishing attacks, based on how well he/she identified real phishing attacks, and/or based on various other factors described below) in order to estimate how likely the message is a real phishing attack. The response provided by an individual may include a flag indicating a message being a possible phishing attack and/or a ranking indicative of the likelihood that a message is a possible phishing attack.

These and other embodiments of the invention are further described in the description that follows.

BRIEF DESCRIPTION OF THE DRAWINGS

The present invention is illustrated by way of example, and not limitation, in the figures of the accompanying drawings in which:

FIG. 2 depicts an example log of simulated phishing attacks, according to one embodiment;

FIG. 3 depicts example responses of individuals to simulated phishing attacks, according to one embodiment;

FIG. 4 depicts example trustworthiness levels, according to one embodiment;

FIG. 5 depicts a table recording various attributes associated with messages that have been identified as being possible phishing attacks and determined not to be simulated phishing attacks, according to one embodiment;

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
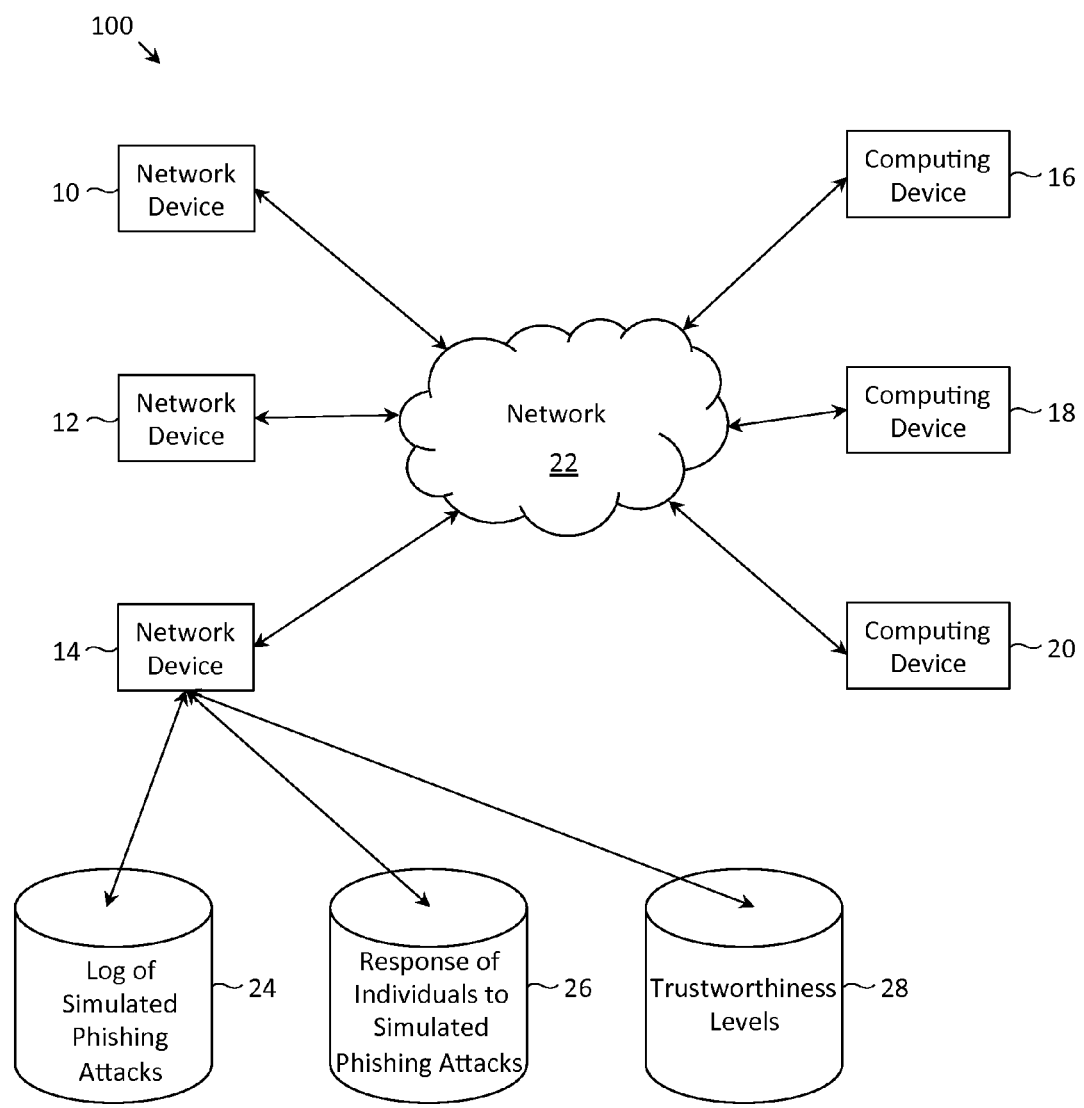
FIG. 1 depicts a system diagram with a collection of interconnected network devices, computing devices and databases, according to one embodiment.

FIG. 1 depicts system 100 in which the present invention may be practiced, in accordance with one embodiment. In system 100, network devices 10, 12 and 14 are communicatively coupled to computing devices 16, 18 and 20 via network 22. The number of devices (3 of each, 6 in total) is exemplary in nature, and more or fewer number of devices may be present. A computing device may be one or more of a client, a desktop computer, a mobile computing device such as a smartphone, tablet computer or laptop computer, and a dumb terminal interfaced to a cloud computing system. A network device may be one or more of a server, a device used by a network administrator, and a device used by an attacker. In general, there may be very few distinctions (if any) between a network device and a computing device.

Network device 14 may be configured to send simulated phishing attacks to computing devices 16, 18 and 20. As described above, simulated phishing attacks are designed to resemble real phishing attacks in order to train the users of computing devices 16, 18 and 20 to better recognize and thwart a real phishing attack. In contrast to network device 14, network devices 10 and 12 may be locally or remotely used by an attacker to send a real phishing attack to computing devices 16, 18 and 20. A network device may be remotely used by an attacker in the event that it has been infected with malware of the attacker.

In one embodiment, three databases 24, 26 and 28 are communicatively coupled to network device 14. Database 24 stores a log of simulated phishing attacks; database 26 records the responses of individuals to simulated phishing attacks; and database 28 records the trustworthiness levels of individuals. Three databases are depicted for illustrative purposes, but in practice any number of the databases may be present within a single storage device. The databases may be located remotely from or locally within network device 14. Further, one or more of databases 24, 26 and 28 may be optional, depending on the particular implementation of system 100.

In one embodiment, network device 14 administers simulated phishing attacks to individuals of computing devices 16, 18 and 20. Each time a simulated phishing attack is transmitted to a computing device, such event may be recorded in the log of simulated phishing attacks 24. Responses (if any) of the individuals to the simulated phishing attacks may be recorded in database 26, and may include any action performed by the individuals in response to a simulated phishing attack. A response may include an individual reporting an attack (e.g., reporting an attack to an IT administrator), an individual ignoring an attack, and an individual falling victim to an attack (e.g., opening an attachment of a simulated phishing attack, following an embedded link of a simulated phishing attack, submitting personal information on an authentication webpage, etc.). For those that identify the message as a possible phishing attack, if the message is determined to be a simulated phishing attack or, eventually, is determined to be a real phishing attack, feedback may be provided confirming that the message was a simulated phishing attack or real phishing attack, as appropriate. The feedback may be in the form of an email message, or an out-of-band message, such as an SMS message or other message. Further, based on the responses (or based on other input), network device 14 may calculate a trustworthiness level associated with each individual of computing devices 16, 18 and 20. The trustworthiness level indicates the degree that a notification from an individual (the notification identifying a message as a possible phishing attack) should be trusted. Such trustworthiness levels may be stored in database 28.

At some point, an attacker may transmit a real phishing attack from one or more of network devices 10 and 12 to one or more of computing devices 16, 18 and 20. Individuals of one or more of computing devices 16, 18 and 20 may notify network device 14 (and/or an administrator thereof) that a received message is a possible phishing attack. Network device 14 may search through the log of simulated phishing attacks 24 to determine whether the message is a simulated phishing attack. Upon determining that the message is not a simulated phishing attack, network device 14 may estimate the likelihood that the message is a real phishing attack. Such likelihood may be calculated via statistical methods and/or heuristics (described further below), and may be a numerical value referred to as a score. In another embodiment, network device 14 may, in addition to or instead of calculating a score, classify or not classify the message as a real phishing attack. Such score and/or classification may be based on respective trustworthiness levels assigned to individuals of computing devices 16, 18 and 20. Where the message is classified as a real phishing attack, feedback may be provided to those individuals that identified the message as a possible phishing attack, confirming that the message was a real phishing attack. The feedback may be in the form of an email message, or an out-of-band message, such as an SMS message or other message.

In another embodiment, a computer program (e.g., plug-in, client-side plug-in, etc.) present at one or more of computing devices 16, 18 and 20 may determine whether a message is a simulated phishing attack or not. For clarity of discussion, suppose an individual of computing device 18 has flagged a message as a possible phishing attack. Instead of consulting network device 14, computing device 18 may determine, locally, whether the flagged message is a simulated phishing attack. A computer program at computing device 18 may examine the sender information of the flagged message in order to make such determination. For instance, there could be a list of sender e-mail addresses, phone numbers, etc. that are used by network device 14 to transmit simulated phishing attacks. If the sender information of the flagged message were included in such a list, that message could be classified as a simulated phishing attack. If the flagged message were determined not to be a simulated phishing attack (hence, flagged message is potentially a real phishing attack), computing device 18 could query network device 14 to determine the trustworthiness level of the individual who flagged the message (i.e., individual using computing device 18). Based on the trustworthiness level of the individual (i.e., if trustworthiness level is sufficiently high), computing device 18 could alert network device 14, a network security appliance (e.g., a gateway, firewall, spam filter—all not depicted), and/or a security event responder (not depicted) that a potentially malicious message was able to thwart security measures and that additional security measures should be taken to ensure that such messages (e.g., messages from same sender as flagged message) are blocked in the future.

FIGS. 2-4 illustrate examples of the contents that may be present in databases 24, 26 and 28. FIG. 2 depicts an example log of simulated phishing attacks. The log indicates that a simulated phishing attack with ID=1 was transmitted at 10:10 AM from a sender masquerading as Jane to the three recipients Ann, Bob and Chip. The subject of the simulated phishing attack was "Review Account Activity". Further indicated in the log is a simulated phishing attack with ID=2 transmitted to Ann, Bob and Chip at 11:57 AM, 11:58 AM and 10:59 AM, respectively. For the simulated phishing attack with ID=2, the sender masqueraded as Tom. Ellipses in the last row of the log indicates that only a portion of the log is being displayed, and more entries may be present. Simulated phishing attacks with a common ID number may identify simulated phishing attacks constructed from a common simulated phishing attack template, as described in related U.S. patent application Ser. No. 13/763,515, filed Feb. 8, 2013, entitled Performance Benchmarking for Simulated Phishing Attacks.

FIG. 3 depicts a table which records individuals' responses to simulated phishing attacks. As indicated in FIG. 3, in response to simulated phishing attack (ID=1), Ann reported the attack, Bob reported the attack, and Chip fell victim to the attack. In response to simulated phishing attack (ID=2), Ann fell victim to the attack, Bob reported the attack, and Chip fell victim to the attack. Further entries in the table should be self-explanatory. From these responses to the simulated phishing attacks, it can be qualitatively inferred that if Ann were to identify a message as a possible phishing attack, her identification should be somewhat trusted. If Bob were to identify a message as a possible phishing attack, his identification should be trusted. In contrast, if Chip were to identify a message as a possible phishing attack, his identification should not be trusted.

FIG. 4 depicts quantitative trustworthiness levels assigned to each individual: Ann=1, Bob=4, and Chip=−2. These trustworthiness levels have been calculated according to the following rules (such rules being exemplary in nature):

1. Each time an individual reports a simulated phishing attack, that individual receives 1 point.
2. Each time an individual ignores a simulated phishing attack, that individual receives 0 points.
3. Each time an individual falls victim to a simulated phishing attack, that victim is penalized 1 point (i.e., receives −1 point).

Therefore, Ann's trustworthiness level is calculated as follows: 1+−1+0+1=1. Bob's trustworthiness level is calculated as follows: 1+1+1+1=4. Chip's trustworthiness level is calculated as follows: −1+−1+1+−1=−2. Of course, such computation and point values are exemplary, and other computations and point values to arrive at a trustworthiness level are possible.

In one embodiment, point values may be based on the type of simulated phishing attack and/or its sophistication. For instance, an individual who reports a sophisticated simulated phishing attack may receive more points (e.g., 2 points) than an individual who reports an unsophisticated simulated phishing attack (e.g., 1 point), because recognizing a sophisticated simulated phishing attack may demonstrate higher recognition abilities than recognizing an unsophisticated simulated phishing attack. Likewise, an individual who falls victim to a sophisticated simulated phishing attack may be penalized fewer points (e.g., penalized 1 point) than an individual who falls victim to an unsophisticated simulated phishing attack (e.g., penalized 2 points). In the former case, falling victim to a sophisticated phishing attack might be more a result of the sophistication of the phishing attack than low recognition abilities of the individual, and hence the penalty should be lower. In contrast, in the latter case, falling victim to an unsophisticated phishing attack is more likely the result of low recognition abilities of the individual, and hence the penalty should be higher.

As mentioned above, point values may also be based on the type of simulated phishing attack. More specifically, the type of a simulated phishing attack may refer to the type of target action or the delivery mechanism. For instance, in response to recognizing a simulated phishing attack with a fraudulent attachment, an individual might receive 3 points; falling victim to same might result in a deduction of 3 points. In response to recognizing a simulated phishing attack with a fraudulent embedded link, an individual might receive 2 points; falling victim to same might result in a deduction of 2 points. In response to recognizing a simulated phishing attack delivered via e-mail, an individual might receive 3 points; falling victim to same might result in a deduction of 3 points. In response to recognizing a simulated phishing attack delivered via a text message, an individual might receive 1 point; falling victim to same might result in a deduction of 1 point.

FIG. 5 depicts a table which helps to illustrate how trustworthiness levels may be used in computing a likelihood that a message is a real phishing attack and further to classify whether a message is a real phishing attack. As depicted in FIG. 5, message 1 was reported by Bob and Chip as a possible phishing attack. In one embodiment, an estimation of a likelihood that a message is a real phishing attack (i.e., called a "score" in short) is the sum of the respective trustworthiness levels of individuals who reported the message. Therefore, the score for message 1 is Bob's trustworthiness level plus Chip's trustworthiness level (i.e., 4+−2) which equals 2. The score for message 2 is computed as Ann's trustworthiness level plus Bob's trustworthiness level (i.e., 1+4) which equals 5. The score for message 3 is Chip's trustworthiness level which equals −2. In one embodiment, a determination as to whether to classify a message as a real phishing attack is based on comparing the score to a threshold. In the example of FIG. 5, the threshold is chosen as 4, and any message with a score that exceeds the threshold (i.e., 4) is classified as a real phishing attack. Therefore, messages 1 and 3 are not classified as a real phishing attack, whereas message 2 is classified as a real phishing attack. The particular numerical value selected for the threshold, of course, is exemplary, and other values may be used. In one embodiment, the threshold is an adjustable parameter, adjusted according to one or more of the number of false alarms and the number of missed detections.

Figure 6:
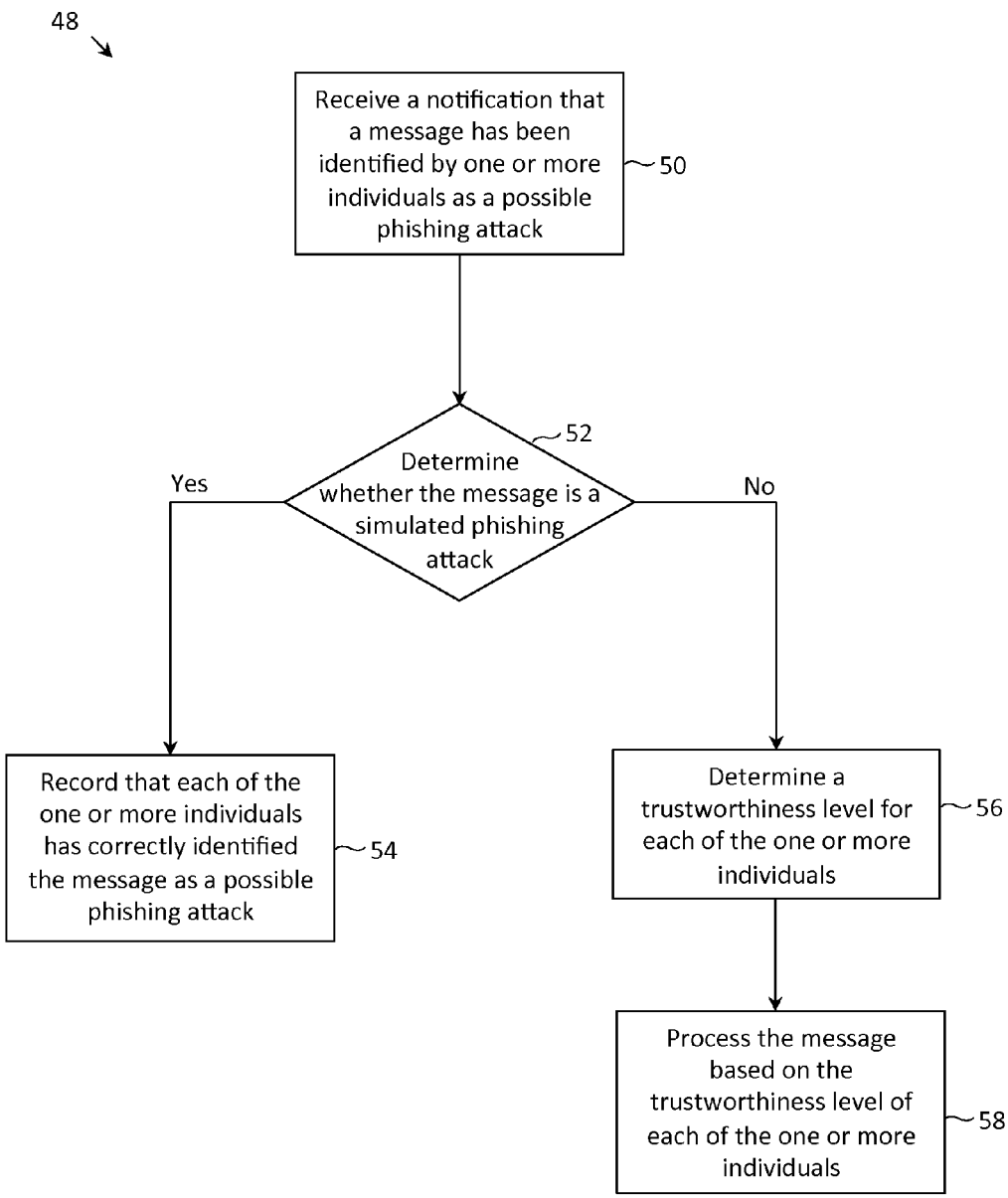
FIG. 6 depicts a flow diagram of a process performed in response to a message being identified by one or more individuals as a possible phishing attack, according to one embodiment.

FIG. 6 depicts a flow diagram 48 of a process performed in response to a message being identified by one or more individuals as a possible phishing attack, according to one embodiment. Such flow diagram is described primarily from the perspective of network device 14 (or a similar device). In step 50, network device 14 receives a notification that a message has been identified by one or more individuals as a possible phishing attack, the message having been received on a computing device of each of the one or more individuals. Such notification may be received via e-mail (e.g., the suspicious e-mail forwarded to a network administrator of network device 14). In one embodiment, a plug-in built into an e-mail client (e.g., MICROSOFT® OUTLOOK®, IBM® LOTUS NOTES®, etc.) or a web-based e-mail client (GMAIL® from GOOGLE INC®, YAHOO! MAIL® from YAHOO! INC®) may provide users of the mail client with a toolbar and/or graphical user interface element that, when selected, automatically reports an e-mail as a suspicious message (and more specifically, as a possible phishing attack) to network device 14 (or administrator thereof) or a network device other than network device 14 (e.g., an e-mail security analysis engine). Further, a single graphical user interface action (e.g., one-click of a button, one-touch of a button) may be sufficient to trigger the notification to be sent to the network device. In the reporting, the suspicious message may be included in its entirety, partially included, or omitted. Identifying characteristics of the suspicious message may be sent to network device 14, including one or more of a sender identifier of the message, a recipient identifier of the message, a subject of the message, a time of transmission of the message, and a header of the message. Network device 14 may be notified that a message has been identified by one or more individuals as a possible phishing attack by means other than e-mail, including a Short Message Service (SMS) text message, a telephone call, an instant message (IM), etc.

In step 52, network device determines whether the message is a simulated phishing attack. In one embodiment, such step may be accomplished by comparing identifying characteristics of the message (e.g., including one or more of a sender identifier of the message, a recipient identifier of the message, a subject of the message, a time of transmission of the message, and message headers) with a log of transmitted simulated phishing attacks. Alternatively or in addition to such comparison, the message body or message content may be compared (via text comparison) to one or more simulated phishing attack templates, such templates described in the above-cited U.S. patent application Ser. No. 13/763,515. Alternatively or in addition to such comparison, a determination of whether a flagged message is a simulated phishing attack may be based on a checksum of the message content. As described earlier, the analysis to determine whether a flagged message is a simulated phishing attack may also be performed at a computing device (e.g., at the client side) instead of at a network device (e.g., at the server side).

In step 54, if the message is identified as a simulated phishing attack, the network device may record in a database (e.g., database 26) that each of the one or more individuals has correctly identified the message as a possible phishing attack. Further, feedback may be provided to the individuals that correctly identified the message, confirming that the message was a simulated phishing attack. The feedback may be in the form of an email message, or an out-of-band message, such as an SMS message or other message. If the message is not identified as a simulated phishing attack, it is possible that an ordinary message (i.e., message without malware) has been incorrectly identified as a possible phishing attack (i.e., false alarm, in which case those who identified the message as a possible phishing attack may be advised that it was not), or the message has been correctly identified as a real phishing attack, in which case feedback may be provided to the individuals that correctly identified the message, confirming that the message was a real phishing attack. In any of these instances, the feedback may be in the form of an email message or an out-of-band message, such as an SMS message or other message. To distinguish between these possibilities, the network device determines a trustworthiness level (step 56) for each of the one or more individuals.

In one embodiment, the trustworthiness level of an individual is based on one or more of a percentage of simulated phishing attacks that the individual correctly identified as a possible phishing attack, a percentage of simulated phishing attacks that the individual ignored, and a percentage of simulated phishing attacks that the individual fell victim to. Alternatively or in addition, the trustworthiness level of an individual may be based on one or more of a number of simulated phishing attacks that the individual correctly identified as a possible phishing attack, a number of simulated phishing attacks that the individual ignored, and a number of simulated phishing attacks that the individual fell victim to. Alternatively or in addition, the trustworthiness level of an individual may be based on one or more of a number of real phishing attacks that the individual correctly identified as a possible phishing attack, a number of real phishing attacks that the individual ignored, and a number of real phishing attacks that the individual fell victim to.

Alternatively or in addition, the trustworthiness level of an individual may be based on one or more of a field of employment of the individual, an educational degree of the individual, a job position of the individual, and an employment history of the individual. For instance, an individual with a Ph.D. in Computer Science specializing in computer security may be one factor that is taken into account when determining a trustworthiness score thereof, and according to predetermined rules, such factor may increase such individual's trustworthiness score by, e.g., 20%. As another example, an individual with 10 years of work experience in computer security may be one factor that is taken into account when determining a trustworthiness score thereof, and according to predetermined rules, such factor may increase such individual's trustworthiness score by, e.g., 15%. Such information (e.g., field of employment of the first individual, an educational degree of the first individual, a job position of the first individual, and employment history of the first individual, etc.) may be stored in a profile associated with each individual, such information being manually queried from the individual or automatically retrieved from a database hosted, e.g., by LINKEDIN®.

Alternatively or in addition, the trustworthiness level of an individual may be based on a rating assigned to the individual by people within a social network of the individual. For instance, the social network could be one hosted by LINKEDIN®, and the people within the social network of the individual might include the individual's co-workers, friends from college, etc. People within the social network of the individual might be asked to rate the individual's knowledge about phishing attacks from a scale from 1 to 10, with 1 being not knowledgeable and 10 being very knowledgeable. Likewise, people within the social network of the individual might be asked to rate the individual's ability to recognize a phishing attack from 1 to 10. If there is more than one person within the social network of the individual, an overall rating may be based on the average of respective ratings assigned by peers of the individual.

A trustworthiness level associated with an individual may be a dynamically determined value (e.g., determined when needed) or may be a pre-calculated value that is retrieved from a database (such as database 28) when needed.

In step 58, the network device processes the message based on the trustworthiness level of each of the one or more individuals. In one embodiment, the network device processes the message by classifying or not classifying the message as a real phishing attack based on the trustworthiness level of each of the one or more individuals. In other embodiments, a confidence score, a likelihood and/or a probability may be provided to inform a person receiving the classification with a more detailed understanding as to how likely a classification is correct (e.g., message is a real phishing attack with a confidence score of 8 out of 10, message is not a real phishing attack with a confidence score of 5 out of 10, etc.). In some embodiments, a binary classification (e.g., Yes/No) of a message as a real phishing attack may be omitted. Instead, a numerical value from a range of values may be provided to inform a person how likely a message is a real phishing attack. Below, a more detailed discussion regarding the classification of a message based on trustworthiness level(s) is provided.

In the case where only one individual has flagged a message as a possible phishing attack, that individual's trustworthiness level may be compared with a threshold in order to classify or not classify the message as a real phishing attack. That individual's trustworthiness level may be provided as a confidence score of the classification. Alternatively, a binary classification may be omitted and the individual's trustworthiness level may be provided as a measure of the likelihood that a message is a real phishing attack.

In the case where more than one individual has flagged a message as a possible phishing attack, an average of the respective trustworthiness levels of those individuals who have flagged the message may be computed, and such average may be compared with a threshold in order to classify or not classify the message as a real phishing attack. Various other statistical measures of the trustworthiness levels may be computed (such as the maximum trustworthiness level, minimum trustworthiness level, mode of trustworthiness levels, etc.) and such statistical measures may be compared with a threshold in order to classify or not classify the message as a real phishing attack.

In one variation, a statistical measure may be computed from only a subset of the respective trustworthiness levels of the individuals. For instance, trustworthiness levels may range from −5 to +5, with −5 being not trustworthy and +5 being trustworthy. In some cases, it may be desirable to simply ignore any trustworthy levels below 0, and take the average of trustworthiness levels above 0. Such average may then be compared with a threshold in order to classify or not classify the message as a real phishing attack.

In one embodiment, individuals may rank the likelihood that a message is a real phishing attack. The rank may be a numeric value, e.g., between 1 and 10, with 1 indicating the message is not likely to be a phishing attack and 10 indicating the message is very likely to be a phishing attack. Therefore, the earlier described instance where an individual flags a message as a possible phishing attack may be interpreted as a specific instance of this more general framework (i.e., binary values being a very limited range of values). In this more general framework, the aggregate likelihood that a message is a real phishing attack may be computed as a weighted average, in which the respective trustworthiness levels of individuals are used to weight the respective ranks. In mathematical notation, suppose $r_i$ equals the rank assigned by the $i^{th}$ individual and suppose $t_i$ equals the trustworthiness level associated with the $i^{th}$ individual. A weighted average of the ranks may be computed as follows: $t_1 r_1 + t_2 r_2 + \ldots t_n r_n$, where there are n individuals providing rankings.

In one embodiment (not depicted), immediately before or after step 52 (i.e., determine whether the message is a simulated phishing attack), network device may also determine whether the message is a known phishing attack. Such determination may rely upon a database that stores known phishing attacks. If so (i.e., message is a known phishing attack), the network device may record that the one or more individuals has correctly identified the message as a possible phishing attack. Otherwise (i.e., message is not a known phishing attack), the process may proceed to step 52 (in the event that such added step occurs immediately prior to step 52), or the process may proceed to step 56 (in the event that such added step occurs immediately after step 52).

Figure 7:
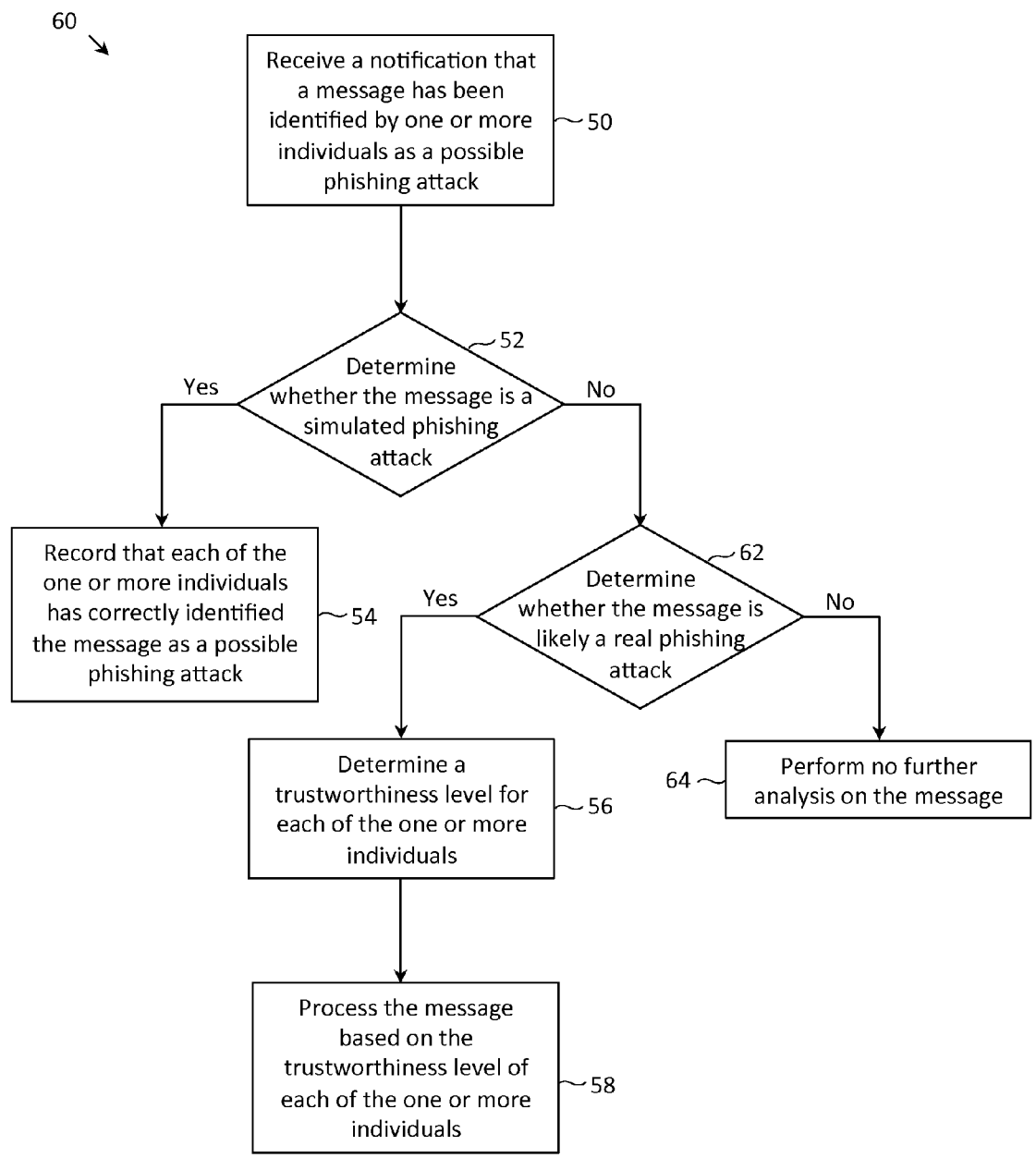
FIG. 7 depicts a flow diagram of a process performed in response to a message being identified by one or more individuals as a possible phishing attack, according to another embodiment.

FIG. 7 depicts a flow diagram 60 of a process performed in response to a message being identified by one or more individuals as a possible phishing attack, according to another embodiment. Such flow diagram is described primarily from the perspective of network device 14 (or a similar device). In step 50, network device 14 receives a notification that a message has been identified by one or more individuals as a possible phishing attack, the message having been received on a computing device of each of the one or more individuals. In step 52, the network device determines whether the message is a simulated phishing attack. In step 54, if the message is identified as a simulated phishing attack, the network device may record in a database (e.g., database 26) that each of the one or more individuals has correctly identified the message as a possible phishing attack. (Steps 50, 52 and 54 have been more fully described above with respect to FIG. 6.)

If the message is not identified as a simulated phishing attack, network device 14 may determine (in step 62) whether the message is likely to be a real phishing attack. Stated differently, step 62 attempts to filter out the false alarms (i.e., notification identifying a message as a possible phishing attack when it is neither a simulated nor a real phishing attack). This way, network device 14 can focus more of its resources (e.g., processing resources) on messages that are more likely to be real phishing attacks. Of course, step 62 may occasionally classify a notification as a false alarm when it in fact has correctly identified a real phishing attack.

If network device 14 determines that the message is not likely to be a real phishing attack, no further analysis is performed on the message (step 64). If network device 14 determines that the message is likely to be a real phishing attack, further analysis is performed on the message to determine whether the message is a real phishing attack and/or to quantify the likelihood that the message is a real phishing attack. Such further analysis, in one embodiment, may involve determining a trustworthiness level for each of the one or more individuals (step 56) and processing the message based on the trustworthiness level of each of the one or more individuals (step 58). (Steps 56 and 58 have been more fully described above with respect to FIG. 6). To clarify, determining whether the message is likely to be a real phishing attack (in step 62) may have a binary output (Yes/No), whereas, quantifying the likelihood that the message is a real phishing attack (in one embodiment of step 58) may have a range of numerical values (e.g., rational values from 0 to 1, integers from 0 to 10, etc.)

There are a variety of techniques through which network device 14 may determine whether the message is likely to be a real phishing attack (in step 62). In one embodiment, network device 14 may count the number of individuals who reported the same message in a period of time (e.g., 1 day), and compare the number of individuals to a threshold. If the number of individuals exceeds the threshold (e.g., threshold of 5 individuals), network device 14 may determine that the message is likely to be a real phishing attack. Otherwise, network device 14 may determine that the message is not likely to be a real phishing attack.

In another embodiment, network device 14 may determine whether a Uniform Resource Locator (URL) present in the message matches an underlying link of the URL. If the URL does not match the underlying link of the URL, network device 14 may determine that the message is likely to be a real phishing attack. Otherwise, network device 14 may determine that the message is not likely to be a real phishing attack.

In another embodiment, network device 14 may determine whether a Domain Name System (DNS) mail record of a sender domain of the message matches a Simple Mail Transfer Protocol (SMTP) server from which the message was sent. If the DNS mail record does not match the SMTP server, network device 14 may determine that the message is likely to be a real phishing attack. Otherwise, network device 14 may determine that the message is not likely to be a real phishing attack.

In another embodiment, network device 14 may determine whether individuals from at least two different organizations have reported the same message as a possible phishing attack. If individuals from at least two different organizations have reported the same message as a possible phishing attack, network device 14 may determine that the message is likely to be a real phishing attack. Otherwise, network device 14 may determine that the message is not likely to be a real phishing attack.

In another embodiment, a combination (e.g., combined using the AND, OR, or other logical operations) of the above-described techniques may be use to determine whether the message is likely to be a real phishing attack. Indeed, an administrator may select to use one or more of the above-described techniques in step 62.

Readers should recognize that various embodiments of the present invention may be implemented with the aid of computer-implemented processes or methods (a.k.a. software, programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), JAVA™ and the like. In general, terms such as software, programs, routines, scripts and the like, as used herein, are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus (referred to above as a network device, computing device, etc.) to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions, and each coupled to a computer system bus, which in turn may be coupled to a processor.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with any computer system configuration, including personal computers, workstations, hand-held devices, multiprocessor systems, microprocessor-based, digital signal processor-based or other programmable consumer electronics, network computers that employ thin client architectures, minicomputers, mainframe computers, and the like. The invention can also be practiced in distributed computing environments where tasks are performed by remote processing devices that are linked through a communications network.

Thus, methods, network devices and machine-readable media for detecting a phishing attack based on the responses of individuals, weighted by their associated trustworthiness levels, have been described. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
   generating, by a network device, a simulated phishing email, the simulated phishing email comprising a first header, wherein the simulated phishing email is a non-malicious email that resembles a phishing attack, and wherein the first header identifies the simulated phishing email as non-malicious;
   electronically storing the first header in a computerized data store;

receiving, by the network device from a computing device associated with an individual, a notification triggered by a user interface action by the individual that an email delivered in an account associated with the individual has been identified by the individual as a possible phishing attack;

in response to receiving the notification, determining whether the identified email is a known simulated phishing attack by comparing the first header stored in the data store to one or more headers of the identified email, said determining occurring at the network device or at the computing device;

when the identified email is determined to be a known simulated phishing attack based on the comparison of the first header stored in the computerized data store to the one or more headers of the identified email, electronically recording that the individual has correctly identified the identified email as a possible phishing attack and providing feedback to the individual confirming that the identified email was a simulated phishing attack; and when the identified email is determined not to be a known simulated phishing attack based on the comparison of the first header stored in the computerized data store to the one or more headers of the identified email, sending the identified email to a computer security technician for review or to an email address configured to receive the identified email or to a computer configured to detect whether or not the identified email is a threat or real phishing attack.

2. The method of claim 1, wherein sending the identified email further comprises sending the identified email to a computer security technician for analysis to determine if the identified email is a real phishing attack or not.

3. The method of claim 1, wherein sending the identified email further comprises sending the identified email to computer configured to detect phishing attacks to determine if the identified email is a real phishing attack or not.

4. The method of claim 1, wherein if the identified email is determined not to be a known simulated phishing attack, and processing of the identified email results in a determination that the identified email is a real phishing attack, providing feedback to the individual that identified the identified email as a possible phishing attack confirming that the identified email was a real phishing attack.

5. The method of claim 1, wherein a single graphical user interface action performed by the individual is sufficient to trigger the notification to be sent from the computing device of the individual.

6. The method of claim 1, wherein determining whether the identified email is a known simulated phishing attack comprises comparing the identified email or a portion of the identified email with simulated phishing attacks.

7. The method of claim 1, wherein determining whether the identified email is a known simulated phishing attack comprises analyzing one or more characteristics of the identified email at a client-side plug-in.

8. The method of claim 1, further comprising providing a plug-in at an email client, wherein the plug-in further provides a single graphical user interface action to be performed by the individual for triggering the notification to be sent from the computing device of the individual.

9. The method of claim 1, wherein the computerized data store electronically storing the first header is at a client-side device, and wherein the determining whether the identified email is a known simulated phishing attack is executed at the client-side device.

10. The method of claim 1, wherein the computerized data store electronically storing the first header is at a network server device, and wherein the determining whether the identified email is a known simulated phishing attack is executed at the network server device.

11. The method of claim 1, further comprising searching through a log of simulated phishing attacks to determine whether the identified email is a simulated phishing attack.

12. The method of claim 1, wherein the determining whether the identified email is a known simulated phishing attack is performed at a client-side plug-in executing at the computing device.

13. A system comprising:
a processor;
a storage device connected to the processor;
a network server device; and
a set of instructions on the storage device that, when executed by the processor, cause the processor perform the steps of:
generating, by a network device, a simulated phishing email, the simulated phishing email comprising a first header, wherein the simulated phishing email is a non-malicious email that resembles a phishing attack, and wherein the first header identifies the simulated phishing email as non-malicious;
electronically storing the first header in a computerized data store;
receiving, by the network device from a computing device associated with an individual, a notification triggered by a user interface action by the individual that an email delivered in an account associated with the individual has been identified by the individual as a possible phishing attack;
in response to receiving the notification, determining whether the identified email is a known simulated phishing attack by comparing the first header stored in the data store to one or more headers of the identified email, said determining occurring at the network device or at the computing device;
when the identified email is determined to be a known simulated phishing attack based on the comparison of the first header stored in the data store to the one or more headers of the identified email, electronically recording that the individual has correctly identified the identified email as a possible phishing attack and providing feedback to the individual confirming that the identified email was a simulated phishing attack; and
when the identified email is determined not to be a known simulated phishing attack based on the comparison of the first header stored in the computerized data store to the one or more headers of the identified email, sending the identified email to a computer security technician for review or to an email address configured to receive the identified email or to a computer configured to detect whether or not the identified email is a threat or real phishing attack.

14. The system of claim 13, wherein sending the identified email further comprises sending the identified email to a computer security technician for analysis to determine if the identified email is a real phishing attack or not.

15. The system of claim 13, wherein sending the identified email further comprises sending the identified email to computer configured to detect phishing attacks to determine if the identified email is a real phishing attack or not.

16. The system of claim 13, wherein if the identified email is determined not to be a known simulated phishing attack, and processing of the identified email results in a determination that the identified email is a real phishing attack, providing feedback to the individual that identified the identified email as a possible phishing attack confirming that the identified email was a real phishing attack.

17. The system of claim 13, wherein a single graphical user interface action performed by the individual is sufficient to trigger the notification to be sent from the computing device of the individual.

18. The system of claim 13, wherein determining whether the identified email is a known simulated phishing attack comprises comparing a characteristic of the identified email with a characteristic of a transmitted simulated phishing attack.

19. The system of claim 18, wherein the characteristic of the identified email message includes one or more of a sender identifier of the identified email, a recipient identifier of the identified email, a subject of the identified email, a time of transmission of the identified email, and a header of the identified email.

20. The system of claim 13, wherein determining whether the identified email is a known simulated phishing attack comprises comparing the identified email or a portion of the identified email with simulated phishing attacks.

21. The system of claim 13, wherein determining whether the identified email is a known simulated phishing attack comprises analyzing one or more characteristics of the identified email at a client-side plug-in.

22. The system of claim 13, further comprising providing a plug-in at an email client, wherein the plug-in further provides a single graphical user interface action to be performed by the individual for triggering the notification to be sent from the computing device of the individual.

23. The system of claim 13, wherein the computerized data store electronically storing the first header is at a client-side device, and wherein the determining whether the identified email is a known simulated phishing attack is executed at the client-side device.

24. The system of claim 13, wherein the computerized data store electronically storing the first header is at a network server device, and wherein the determining whether the identified email is a known simulated phishing attack is executed at the network server device.

25. The method of claim 13, further comprising searching through a log of simulated phishing attacks to determine whether the identified email is a simulated phishing attack.

26. The method of claim 13, wherein the determining whether the identified email is a known simulated phishing attack is performed at a client-side plug-in executing at the computing device.

27. A method, comprising:
generating, by a network device, a simulated phishing email, the simulated phishing email comprising a first header, wherein the simulated phishing email is a non-malicious email that resembles a phishing attack, and wherein the first header identifies the simulated phishing email as non-malicious;
electronically storing the first header in a computerized data store;
receiving, by the network device from a computing device associated with an individual, a notification triggered by a user interface action by the individual that an email delivered in an account associated with the individual has been identified by the individual as a possible phishing attack;
in response to receiving the notification, determining whether the identified email is a known simulated phishing attack by comparing the first header stored in the data store to one or more headers of the identified email, said determining occurring at the network device or at the computing device;
sending at least one of the one or more headers of the identified email to the network device; and
when the identified email is determined to be a known simulated phishing attack based on the comparison of the first header stored in the computerized data store to the one or more headers of the identified email, electronically recording that the individual has correctly identified the identified email as a possible phishing attack and providing feedback to the individual confirming that the identified email was a simulated phishing attack; and
when the identified email is determined not to be a known simulated phishing attack based on the comparison of the first header stored in the computerized data store to the one or more headers of the identified email, sending the identified email to a computer security technician for review or to an email address configured to receive the identified email or to a computer configured to detect whether or not the identified email is a threat or real phishing attack.

28. The method of claim 16, wherein the determining whether the identified email is a known simulated phishing attack is performed at a client-side plug-in executing at the computing device.

29. The method of claim 16, wherein a single graphical user interface action performed by the individual is sufficient to trigger the notification to be sent from the computing device of the individual.

30. The method of claim 16, further comprising providing a plug-in at an email client, wherein the plug-in further provides a single graphical user interface action to be performed by the individual for triggering the notification to be sent from the computing device of the individual.

* * * * *